United States Patent [19]

Viscusi

[11] Patent Number: 4,868,905
[45] Date of Patent: Sep. 19, 1989

[54] MOTOR AND OTHER APPARATUS WITH NOVEL POWER LEAD ATTACHMENT STRUCTURE

[76] Inventor: David A. Viscusi, 150 Sunset Dr., Carlisle, Pa. 17013

[21] Appl. No.: 173,972

[22] Filed: Mar. 28, 1988

[51] Int. Cl.$^4$ .................................... H02K 11/00
[52] U.S. Cl. ................................ 310/71; 439/457
[58] Field of Search ............... 310/71; 439/456, 457, 439/458, 459

[56] References Cited

U.S. PATENT DOCUMENTS

| | | | |
|---|---|---|---|
| 2,573,600 | 10/1951 | Pruehs | 439/457 |
| 3,427,553 | 2/1969 | Smulowitz et al. | 439/459 |
| 3,826,935 | 7/1974 | Grierson et al. | 310/71 |
| 4,038,573 | 7/1977 | Hillyer et al. | 310/71 |
| 4,117,998 | 10/1978 | Notoya | 439/459 |
| 4,224,465 | 9/1980 | Ruzic | 439/459 |

Primary Examiner—William M. Shoop, Jr.
Assistant Examiner—Marc S. Hoff
Attorney, Agent, or Firm—Robert R. Hubbard; Robert S. Smith

[57] ABSTRACT

A retaining apparatus for retaining an associated wire includes a first slot having a width that is substantially the same as the wire, including any insulation, that is to be retained. The first slot is dimensioned for snug engagement with the associated wire. A second slot intersects the first slot. The second slot has walls at least in some portion in the slot which have an interference with the associated wire to be retained.

3 Claims, 2 Drawing Sheets

MOTOR AND OTHER APPARATUS WITH NOVEL POWER LEAD ATTACHMENT STRUCTURE

BACKGROUND OF THE INVENTION

The invention relates to electric motors and particularly to the manner of installing and connecting the electric leads or terminations supplying power to such motors. While the application has particular application to small and inexpensive electric motors used in various applications such as electric vacuum cleaners, it will be understood that the invention also has application to a wide variety of other electric motors as well as other electrical devices in which it is desired to quickly secure electrical wires. The invention also has particular application to small motors which incorporate a plastic housing somewhat in the form of a clam shell whereby motor assembly is accomplished in a first half of the shell and the second half is clamped or fastened to the first half to close the motor housing.

The invention has particular application to motors incorporating a poke-in terminal construction described in U.S. Pat. No. 4,038,573 which is owned by the assignee of the present application. The poke-in terminal construction eliminates the earlier prior art necessity of soldering or splicing motor leads to internal motor windings; however, the construction described in the cited patent still necessitates the motor leads being routed within the housing casing to appropriate exit points before closure of the clam shell housing. Accordingly, the manufacturer of the appliance that incorporated the motor was obliged to solder or splice the motor leads outside the motor to the electric wires of the appliance.

Accordingly, it is an object of the invention to provide a motor and a motor housing which facilitates installation of a poke-in terminal followed by routing of the leads to secure the motor leads positively within the housing without the necessity of splicing or soldering.

Still another object of the invention is to provide a very simple construction which will be very inexpensive to manufacture.

Yet another object of the invention is to provide apparatus which will require a minimum of labor to install and connect lead wires to the associated appliance wiring and thus minimize manufacturing assembly time and cost.

It is an object of the invention to eliminate any requirement that separate lead wires be a part of the motor assembly and, more particularly, to allow other appliance wires to be more easily fixed to the motor.

Another object of the invention is to provide a construction in which strain relief is provided for the lead wires.

Still another object of the invention is to provide strain relief for the lead wires which is directed into a plane away from the direction in which the wire is initially inserted.

SUMMARY OF THE INVENTION

It has now been found that these and other objects of the invention may be attained in a retaining apparatus for retaining an associated wire which includes a first slot has a width that is substantially the same as the wire that is to be retained so that the first slot has a snug engagement with the associated wire. A second slot intersects the first slot. The second slot has walls at least in some portion of the second slot which have an interference with the associated wire to be retained.

The first and second slots may intersect at an angle which may be less than 180 degrees and in some embodiments intersect at an angle which is approximately 90 degrees. Means for securing the associated wire to other circuitry may be disposed in generally aligned relationship with the first slot.

The invention also includes electric motors incorporating the means for retention.

BRIEF DESCRIPTION OF THE DRAWING

The invention will be better understood by reference to the accompanying drawing in which.

DESCRIPTION OF THE PREFERRED EMBODIMENT

Figure 1:
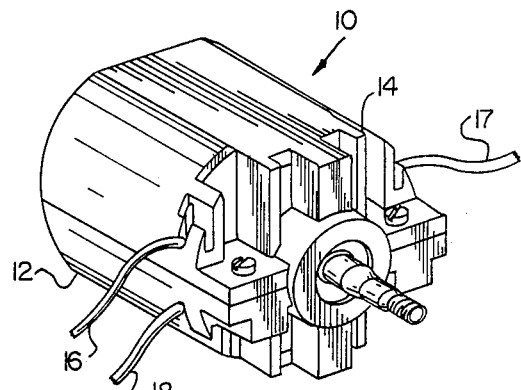
FIG. 1 is a perspective view of a motor having power leads connected in accordance with one form of the present invention.

Referring now to FIG. 1 there is shown a motor 10 in accordance with the present invention. The motor 10 is characterized by a housing which comprises an assembly half 12 and a cover half 14. It will be understood that typically such motors are assembled in the assembly half 12 and thereafter the cover half 14 is mated with the assembly half 12 to complete the assembly of the motor 10.

Figure 2:
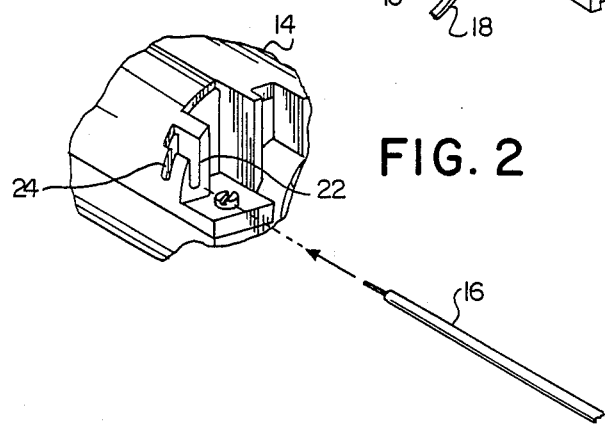
FIG. 2 is a side elevational view of a portion of the housing of the motor illustrated in FIG. 1 that illustrates the manner of insertion of a single lead into the motor for connection with the internal windings.
Figure 3:
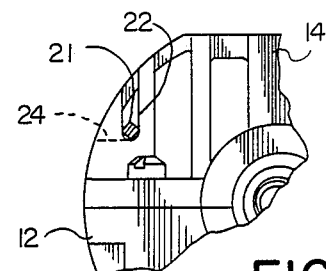
FIG. 3 is an end elevational view of a portion of the motor shown in FIG. 1 and illustrating more specifically the pocket in the internal motor windings in which the power lead shown in FIG. 2 is inserted.

Referring now also to FIGS. 2-7, power leads 16, 17, 18 are shown extending from the motor 10. The construction of the cover half 14 includes a slot 22 that communicates with the interior of the motor 10, as best shown in FIG. 3, for access to an internal pocket 21. The internal pocket 21 is associated with the motor winding as described in United States patent 4,038,573. The first slot 22 ordinarily has substantially parallel planar walls and will ordinarily be formed in the molded plastic resin housing of the motor as will a second slot 24 which is disposed at right angles to the first slot 22. The second slot 24 communicates with the first slot 22 and has side walls which are parallel in the preferred embodiment. The second slot 24 has walls that converge slightly near the bottom of the slot. The convergence of the walls of the second slot 24 is intentional to provide a locking engagement with the the lead wire 16,17,or 18 with which the second slot 24 cooperates. It will also be understood that even the first slot 22 is dimensioned for a snug fit with the wire, including any insulation, and will have a very slight angle between the respective walls defining the slot to facilitate molding of the housing.

Various angles between the first slot 22 and the second slot 24 may be utilized without departing from the spirit of the invention. The angle between the first slot 22 and the second slot 24 may be any angle less than 180 degrees even though 90 degrees has been found to be particularly desirable.

To install the lead wire 16 the person making the connections to the motor 10 strips the insulation from the wire 16, orients the motor 10 as shown in FIG. 3 to make the pocket 21 visible and inserts the axial extremity of the wire 16 through the slot 22 and into the pocket 21 as shown in FIG. 2.

Figure 4:
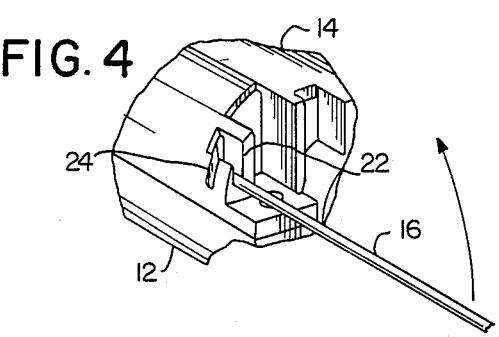
FIG. 4 is a perspective view of a portion of the motor shown in FIG. 1 that illustrates the manner in which the power lead is thereafter moved to seat the power lead in the structure in accordance with the present invention.
Figure 5:
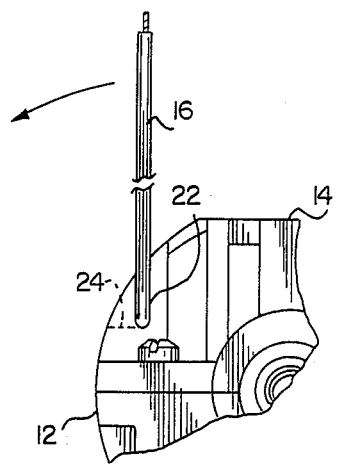
FIG. 5 is an end elevational view of a portion of the motor shown in FIG. 1 illustrating the manner of movement thereafter of the power lead to fully seat the wire in the structure of the present invention.
Figure 6:
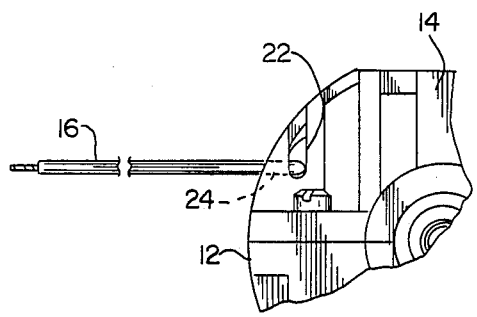
FIG. 6 is an end elevational view of a portion of the motor shown in FIG. 1 showing the position of the wire after the power lead has been seated.
Figure 7:
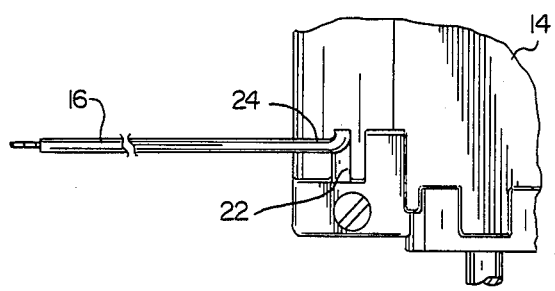
FIG. 7 is a plan view of the portion of the motor shown in FIG. 1 showing still further the manner in which the power lead is located after the power lead has been fully seated.

The lead wire 16 is then moved upwardly as best seen in FIG. 4 within the first slot 22 and pulled down into the second slot 24 as best seen in FIGS. 5. FIGS. 6 and 7 show the position of the wire 16 after it has been fully seated in the slot 24. The converging walls of the second slot 24 will serve to lock the lead wire 16 in place. In a similar manner, the other lead wires 17,18 are installed. Accordingly, the wiring of the appliance can be connected to the motor 10 without the necessity for separate lead wires on the motor. Thus, the installation is very simple, fast and economical.

The description above applies to the construction of the housing for a single lead. It will be understood that a typical motor will have two leads and that the other slot arrangement for the second lead will be disposed at some other point on the housing. The other point may be in the same half of the housing or in the other half of the housing. To provide variable speed capabilities and reversing additional power leads may be necessary. For example, as will be seen in FIG. 1, three lead wires 16,17,18 may extend from the internal windings.

Although it is not essential to the invention, the pocket for the poke-in lead wire will preferably be constructed in accordance with U.S. Pat. No. 4,038,573.

The apparatus in accordance with the present invention is particularly adapted to facilitate installation of the motor 10 in an appliance or other assembly. The internal wiring of that assembly will include power lead wires 16,17 and 18 which may be poked in to respective pockets 21. It will be understood, of course, that the preceding description pertains only to a single lead wire and that the installation of each of the other lead wires is substantially the same.

It will be understood that the invention may be utilized to secure wires such as the terminations of the motor windings which may already have an axial extremity thereof fixed onto the end of a winding of a motor or may merely be the axial extremity of the motor winding itself. More specifically, it will be understood that the system of slots in accordance with the invention will retain the axial extremities of the windings so that the final assembly is less vulnerable to damage than other alternative designs.

The invention has been described with reference to its illustrated preferred embodiment. Persons skilled in the art of motors may upon exposure to the teachings herein, conceive other variations. Such variations are deemed to be encompassed by the disclosure, the invention being delimited only by the appended claims.

Having thus described my invention, I claim:

1. A motor which comprises:
   a housing;
   first and second poke-in terminals;
   first and second power leads;
   means for retaining said first power lead including a first and second slots, said first slot having a width that is substantially the same as said first power lead, said first slot being substantially aligned with said first poke-in terminal, said second slot intersecting said first slot, said second slot having walls at least in some portion thereof having an interference fit with said said first power lead; and
   means for retaining said second power lead including third and fourth slots, said third slot having a width that is substantially the same as said second power lead, said third slot being substantially aligned with said second poke-in terminal, said fourth slot intersecting said third slot, said fourth slot having walls at least in some portion thereof having an interference fit with said second power lead.

2. The motor as described in claim 1 wherein:
   said first and second slots intersect at an angle which is less than 180 degrees.

3. The motor as described in claim 2 wherein:
   said first and second slots intersect at an angle which is approximately 90 degrees.

* * * * *